(12) United States Patent
Yen

(10) Patent No.: US 9,684,362 B2
(45) Date of Patent: Jun. 20, 2017

(54) BATTERY POWERED DEVICE

(71) Applicant: Quanta Computer Inc., Taoyuan (TW)

(72) Inventor: Wei-Ting Yen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 130 days.

(21) Appl. No.: 14/618,304

(22) Filed: Feb. 10, 2015

(65) Prior Publication Data
US 2016/0187960 A1 Jun. 30, 2016

(30) Foreign Application Priority Data

Dec. 29, 2014 (TW) .............................. 103145984 A

(51) Int. Cl.
| | | |
|---|---|---|
| *G06F 1/32* | (2006.01) | |
| *G06F 1/26* | (2006.01) | |
| *H01M 10/42* | (2006.01) | |
| *H02J 7/00* | (2006.01) | |
| *H01M 10/48* | (2006.01) | |

(52) U.S. Cl.
CPC ............ *G06F 1/3287* (2013.01); *G06F 1/263* (2013.01); *H01M 10/425* (2013.01); *H02J 7/0029* (2013.01); *G06F 1/3203* (2013.01); *H01M 10/486* (2013.01)

(58) Field of Classification Search
CPC ............................ G06F 1/3287; G06F 1/3212
USPC .......................................................... 713/323
See application file for complete search history.

(56) References Cited

U.S. PATENT DOCUMENTS

| | | | | |
|---|---|---|---|---|
| 5,721,481 | A | * 2/1998 | Narita | ................... H02J 7/0013 307/46 |
| 6,523,125 | B1 | * 2/2003 | Kohno | ................... G06F 1/3203 713/320 |
| 8,618,805 | B2 | 12/2013 | Li | |
| 2003/0122525 | A1 | * 7/2003 | Stellberger | ............ H02J 7/0026 320/134 |

(Continued)

FOREIGN PATENT DOCUMENTS

TW 200822484 5/2008

OTHER PUBLICATIONS

Chinese language office action dated Oct. 15, 2015, issued in application No. TW 103145984.

*Primary Examiner* — Jaweed A Abbaszadeh
*Assistant Examiner* — Volvick Derose
(74) *Attorney, Agent, or Firm* — McClure, Qualey & Rodack, LLP

(57) ABSTRACT

A battery powered device providing battery power to a processing device via a positive terminal and a negative terminal and including a first switch, a second switch, a battery unit and a control unit is provided. The first switch is coupled to the positive terminal. The second switch is coupled to the first switch. The battery unit is coupled between the second switch and the negative terminal. The control unit operates in an off mode when the control unit receives the turn-off command. The control unit operates in a power-saving mode when the control unit receives the save command. When the control unit operates in the off mode, the control unit turns off the first and second switches. When the control unit operates in the power-saving mode, the control unit turns off the first switch and turns on the second switch.

11 Claims, 4 Drawing Sheets

(56) References Cited

U.S. PATENT DOCUMENTS

| | | | | |
|---|---|---|---|---|
| 2007/0024243 | A1* | 2/2007 | Liu | H02J 7/0031 320/134 |
| 2010/0141219 | A1* | 6/2010 | Li | H01M 10/441 320/162 |
| 2010/0299543 | A1* | 11/2010 | Kim | G06F 1/266 713/320 |
| 2011/0296218 | A1* | 12/2011 | Kim | H02J 3/32 713/323 |
| 2012/0131367 | A1* | 5/2012 | Kamijima | H02J 7/0021 713/323 |
| 2013/0026992 | A1* | 1/2013 | Ruan | H01M 10/42 320/118 |
| 2013/0127518 | A1* | 5/2013 | Nakao | H02M 1/36 327/434 |
| 2013/0166928 | A1* | 6/2013 | Yang | G06F 1/266 713/300 |
| 2013/0249446 | A1* | 9/2013 | Kumagai | B60L 11/1859 318/139 |
| 2014/0246904 | A1* | 9/2014 | Wu | H02J 9/00 307/23 |

* cited by examiner

BATTERY POWERED DEVICE

CROSS REFERENCE TO RELATED APPLICATIONS

This Application claims priority of Taiwan Patent Application No. 103145984, filed on Dec. 29, 2014, the entirety of which is incorporated by reference herein.

BACKGROUND OF THE INVENTION

Field of the Invention

The invention relates to a battery powered device, and more particularly to a battery powered device, which operates in different operation modes according to different control commands.

Description of the Related Art

As technology develops, functions and types of electronic devices have increased. Among various electronic devices, mobile electronic devices are widely used. Generally, each of the mobile devices has a built-in battery to maintain the operation of the mobile device. However, when a battery is built in a mobile electronic device, if a tester desires to assemble or test the mobile electronic device, the tester may inadvertently cause a short event between the positive terminal with the negative terminal of the battery.

BRIEF SUMMARY OF THE INVENTION

In accordance with an embodiment, a battery powered device provides battery power to a processing device via a positive terminal and a negative terminal. The processing device operates on external power, or the battery power, and generates a turn-off command and a save command according to a user input. The external power is provided by a connection port coupled to a power adapter. The battery powered device comprises a first switch, a second switch, a battery unit and a control unit. The first switch is coupled to the positive terminal. The second switch is coupled to the first switch. The battery unit is coupled between the second switch and the negative terminal. The control unit operates in an off mode when the control unit receives the turn-off command. The control unit operates in a power-saving mode when the control unit receives the save command. When the control unit operates in the off mode, the control unit turns off the first and second switches. When the control unit operates in the power-saving mode, the control unit turns off the first switch and turns on the second switch.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
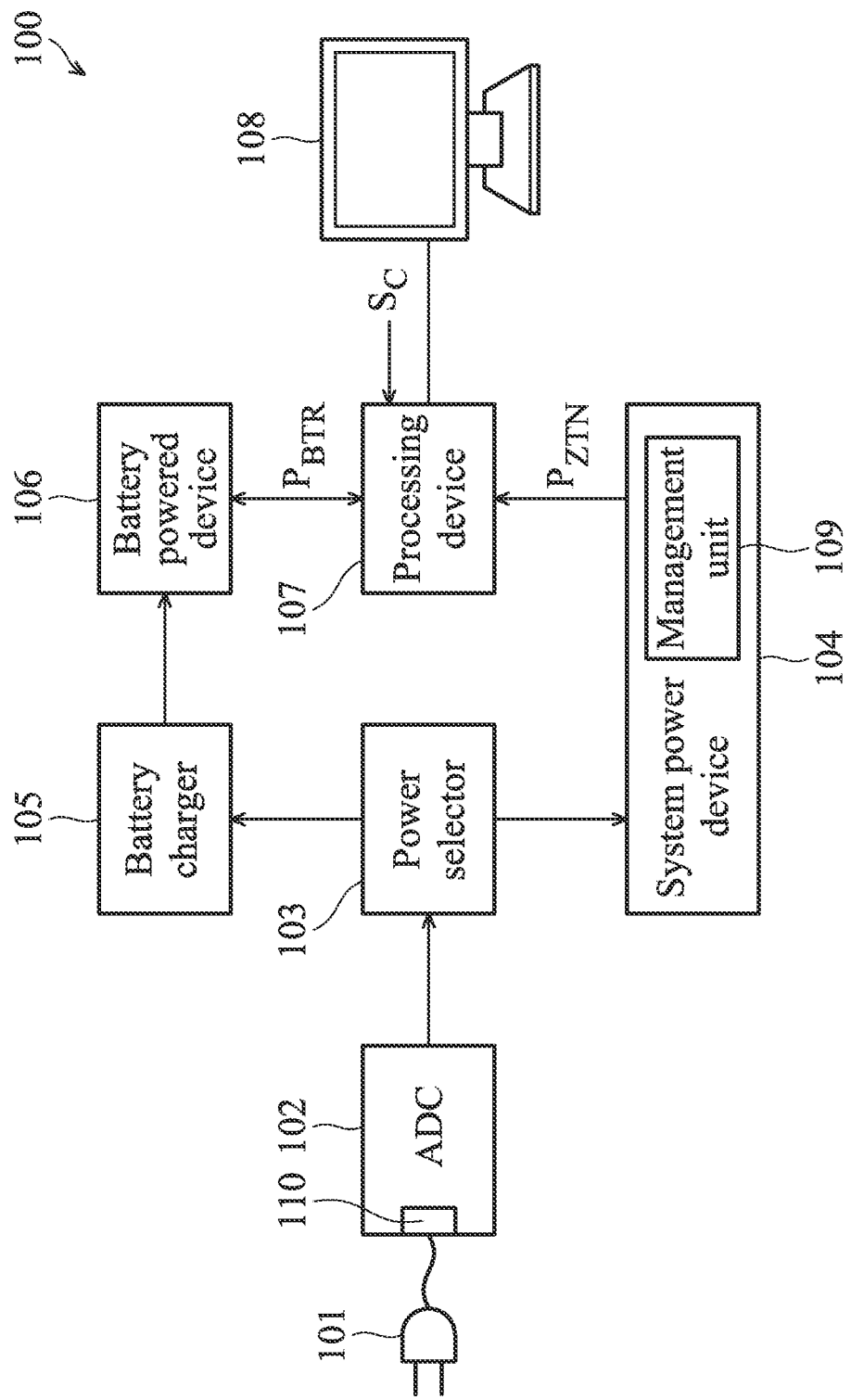
FIG. 1 is a schematic diagram of an exemplary embodiment of an operation system in accordance with an embodiment.

FIG. 1 is a schematic diagram of an exemplary embodiment of an operation system in accordance with an embodiment. The operation system 100 comprises a power adapter 101, an analog-to-digital converter (ADC) 102, a power selector 103, a system power device 104, a battery charger 105, a battery powered device 106, a processing device 107, and a load device 108. The invention does not limit kind of the operation system 100. In this embodiment, the operation system 100 has an office system (OS; not shown in FIG. 1). In one embodiment, the operation system 100 is a personal computer or a smart phone.

The power adapter 101 receives AC mains. The ADC 102 is coupled to the power adapter 101 to convert the AC mains from an AC format into a DC format. In this embodiment, the ADC 102 comprises a connection port 110 configured to connect to the power adapter 101. In other embodiments, the connection port 110 is independently disposed outside of the ADC 102.

The power selector 103 transmits the output voltage generated by the ADC 102 to the system power device 104 and the battery charger 105. The system power device 104 comprises a management unit 109 to manage the internal powers of the operation system 100 and provides power $P_{ETN}$ to the processing device 107. In this embodiment, the power $P_{ETN}$ is provided by the external AC mains. Therefore, the power $P_{ETN}$ is referred to as external power.

The battery charger 105 charges the battery (not shown in FIG. 1) of the battery powered device 106 according to the output of the power selector 103. The battery powered device 106 provides battery power $P_{BTR}$ to the processing device 107. In this embodiment, the battery powered device 106 communicates with the processing device 107 to receive or provide power and data. The battery powered device 106 performs corresponding operations according to control commands generated by the processing device 107. For example, the battery powered device 106 provides the battery power $P_{BTR}$ to the processing device 107, or the processing device 107 captures current from the battery powered device 106.

The processing device 107 drives the load device 108 according to the power $P_{ETN}$ or $P_{BTR}$. In this embodiment, the load device 108 is a display device, but the disclosure is not limited thereto. In some embodiments, the load device 108 may be an other electronic device. In this embodiment, the processing device 107 generates a corresponding command according to a control signal $S_C$ to control the output of the battery powered device 106. In one embodiment, the control signal $S_C$ relates to the set of a user. For example, the user sets the state of the control signal $S_C$ via an OS to control the operation mode of the battery powered device 106.

The invention does not limit the communication protocol between the processing device 107 and the battery powered device 106. In one embodiment, an inter integrated circuit bus (I2C bus) or a system management bus (SM bus) is disposed between the processing device 107 and the battery powered device 106 to transmit data or power.

Figure 2:
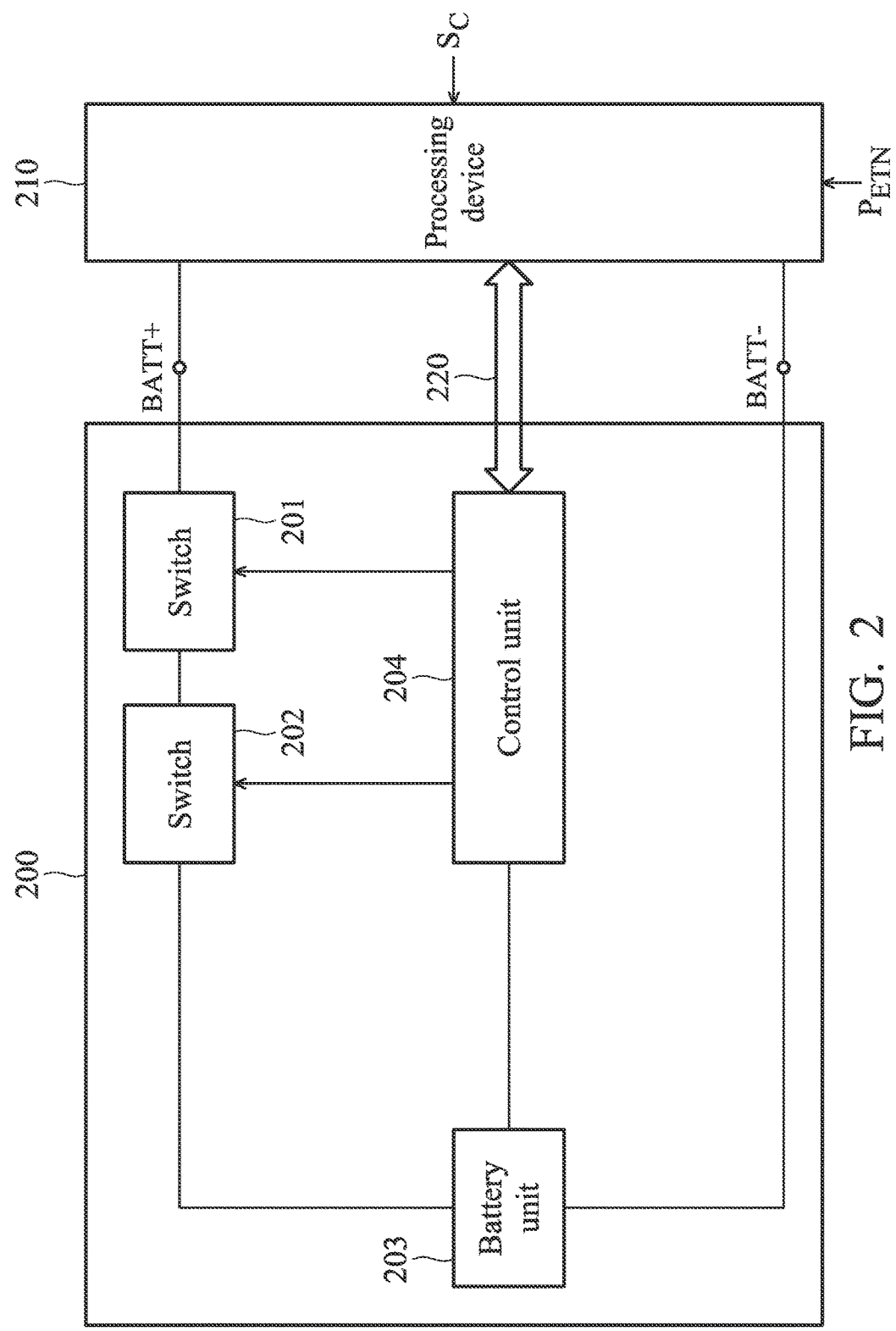
FIG. 2 is a schematic diagram of an exemplary embodiment of a battery powered device in accordance with an embodiment.

FIG. 2 is a schematic diagram of an exemplary embodiment of a battery powered device in accordance with an embodiment. In this embodiment, the battery powered device 200 is coupled to the processing device 210 via a positive terminal BATT+ and a negative terminal BATT− to provide battery power (e.g. $P_{BTR}$) to the processing device 210. Additionally, the battery powered device 200 communicates with the processing device 210 via a bus 220. Therefore, the processing device 210 is capable of generating a corresponding command to the battery powered device 200 according to a user input or a device input.

In this embodiment, the battery powered device 200 comprises switches 201 and 202, a battery unit 203, and a control unit 204. The switch 201 is coupled to the positive terminal BATT+. The switch 202 is coupled to the switch 201. The battery unit 203 is coupled between the switch 202 and the negative terminal BATT−. In this embodiment, the switches 201 and 202 form a path to charge or discharge the battery unit 203. The invention does not limit kinds of the switches 201 and 202. In one embodiment, the switches 201 and 202 are transistors, such as FETs.

The control unit 204 turns on or off the switches 201 and 202 according to the command generated by the processing device 210. In one embodiment, when the processing device 210 generates a turn-off command according to the control signal $S_C$, the control unit 204 operates in an off mode according to the turn-off command. In the off mode, the control unit 204 turns off the switches 201 and 202. Therefore, the battery powered device 200 stops providing the battery power to the processing device 210, and there is no power between the positive terminal BATT+ and the negative terminal BATT−. Since the switches 201 and 202 are turned off, the battery unit 203 has a minimum power loss.

In another embodiment, when the processing device 210 generates a save command according to the control signal $S_C$, the control unit 204 operates in power-saving mode according to the save command. In the power-saving mode, the control unit 204 turns off the switch 201 and turns on the switch 202. In one embodiment, if the switch 201 is a transistor, since the transistor has a body diode, a voltage occurs between the positive terminal BATT+ and the negative terminal BATT−. However, the battery powered device 200 does not communicate with the processing device 210 and does not provide current to the processing device 210. Therefore, when the control unit 204 operates in the power-saving mode, the processing device 210 also operates on the external power $P_{ETN}$.

In other embodiments, when the processing device 210 generates a normal command according to the control signal $S_C$, the control unit 204 operates in a normal mode according to the normal command. In the normal mode, the control unit 204 turns on the switches 201 and 202 to provide battery power to the processing device 210. At this time, the processing device 210 operates on the battery power.

In one embodiment, a user can utilize an OS to set the control signal $S_C$. For example, while the user assembles the operation system 100, if the user does not cut-off the path transmitting the battery power, the positive terminal of the battery may be contact with the negative terminal of the battery via any conductive material. Therefore, in one embodiment, the user activates the off function of the OS, and the battery powered device 200 enters an off mode.

After the user activates the off function, the control signal $S_C$ is in a first state. The processing device 210 sends a turn-off command to the battery powered device 200 according to the control signal $S_C$. When the user finishes the assembly of the operation system 100, the user deactivates the off function via a release event. In one embodiment, when the user presses a specific button (e.g. a function key F3), the control signal $S_C$ is in a release state. The processing device 210 sends a release command to the battery powered device 200 according to the control signal $S_C$ such that the control unit 204 enters a normal mode from the off mode to normally provide power to the processing device 210. Therefore, the processing device 210 operates on the battery power.

In the above embodiment, the release event means that a specific button is pressed. In another embodiment, assuming that the power adapter 101 was originally plugged into the connection port 110. In this case, the release event means that the power adapter 101 is unplugged from the connection port 110 and then plugged into the connection port 110. When the user unplugs the power adapter 101 from the connection port 110 and then plugs the power adapter 101 into the connection port 110, the operation mode of the battery powered device 200 is changed from the off mode into the normal mode to provide the battery power to the processing device 210.

Similarly, if the user wants the battery powered device 200 to enter a power-saving mode, the user can utilize the OS to activate a save function. At this time, the control signal $S_C$ is in a second state. The processing device 210 sends a save command according to the control signal $S_C$ such that the battery powered device 200 enters a power-saving mode according to the save command. In the power-saving mode, the battery powered device 200 does not provide current to the processing device 210. When the user desires to deactivate the save function, the user presses another specific button, such as the function key F3 or a power key. At this time, the control signal $S_C$ is in a release state. The processing device 210 sends a release command to the battery powered device 200 according to the control signal $S_C$. Therefore, the battery powered device 200 enters a normal mode to provide power the processing device 210 normally.

Since the user can utilize the OS to control the operation mode of the battery powered device, the user can provisionally turn off the battery unit during a tests step or a assembly step. Therefore, the problem wherein the positive terminal of the battery unit contacts the negative terminal of the battery unit can be avoided, and the safety of the battery unit can be increased. The user only presses a specific button or unplugs and then plugs in the power adapter to release the off mode. Therefore, the off event is released more easily.

Figure 3:
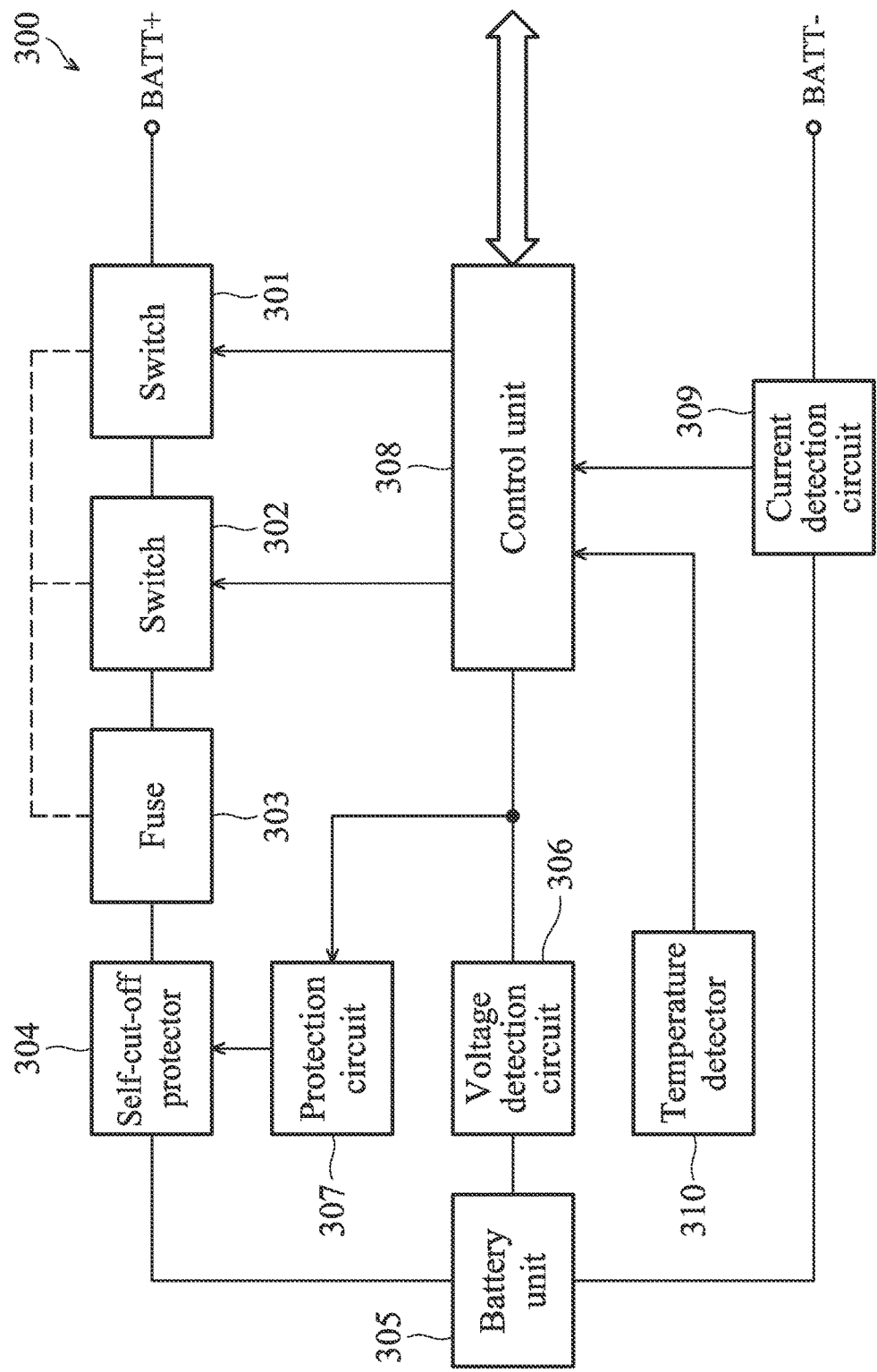
FIG. 3 is a schematic diagram of another exemplary embodiment of a battery powered device in accordance with an embodiment.

FIG. 3 is a schematic diagram of another exemplary embodiment of a battery powered device in accordance with an embodiment. FIG. 3 is similar to FIG. 2, except that the battery powered device 300 also has a protection function. When the battery unit 305 is abnormal, the battery powered device 300 stops providing power to the processing device. In this embodiment, the battery powered device 300 comprises switches 301 and 302, a fuse 303, a self-cut-off protector 304, a battery unit 305, a voltage detection circuit 306, a protection circuit 307, a control unit 308, a current detection circuit 309, and a temperature detector 310.

In this embodiment, the control unit 308 controls the switches 301 and 302 according to the received control signal and the temperature, the voltage, and the current of the battery unit 305. For example, when the switches 301 and 302 are too hot, it means that the battery powered device 300 is abnormal. Therefore, the fuse 303 is cut to stop transmitting the battery power.

The self-cut-off protector 304 is controlled by the protection circuit 307. When the control unit 308 cannot turn off the switches 301 and 302 in the normal manner, the protection circuit 307 triggers the self-cut-off protector 304 to cut-off the discharge path of the battery unit 305 and stop outputting the battery power.

The voltage detection circuit 306 detects the output voltage of the battery unit 305. The control unit 308 controls the switches 301 and 302 according to the detection result of the voltage detection circuit 306. When the output voltage of the battery unit 305 is abnormal, the control unit 308 turns off the switches 301 and 302. In this embodiment, the protection circuit 307 also receives the detection result of the voltage detection circuit 306. When the control unit 308 cannot immediately turn off the switches 301 and 302, the protection circuit 307 triggers the self-cut-off protector 304, and the battery unit 305 stops outputting the battery voltage. In another embodiment, the detection result of the voltage detection circuit 306 is provided to the external processing device (e.g. 210). The external processing device determines whether the battery power of the battery unit 305 is abnormal. When the battery power of the battery unit 305 is abnormal, the external processing device sends an off command to the control unit 308 such that the switches 301 and 302 are turned off.

The current detection circuit 309 detects the output current of the battery unit 305. The control unit 308 controls the switches 301 and 302 according to the detection result of the current detection circuit 309. When the output current of the battery unit 305 is abnormal, the control unit 308 turns off the switches 301 and 302. In another embodiment, the current detection circuit 309 provides the current detection result to an external processing device (e.g. 210). The external processing device determines whether the output current of the battery unit 305 is abnormal. When the output current of the battery unit 305 is abnormal, the external processing device sends an off command such that the control unit 308 turns off the switches 301 and 302.

The temperature detector 310 detects the temperature of the battery unit 305. The control unit 308 controls the switches 301 and 302 according to the detection result generated by the temperature detector 310. When the temperature of the battery unit 305 is abnormal, such as too high, the control unit 308 turns off the switches 301 and 302. In another embodiment, the temperature detector 310 provides the detection result to an external processing device (e.g. 210). The external processing device determines whether the temperature of the battery unit 305 is abnormal. When the temperature of the battery unit 305 is abnormal, the external processing device sends an off command such that the control unit 308 turns off the switches 301 and 302.

Figure 4:
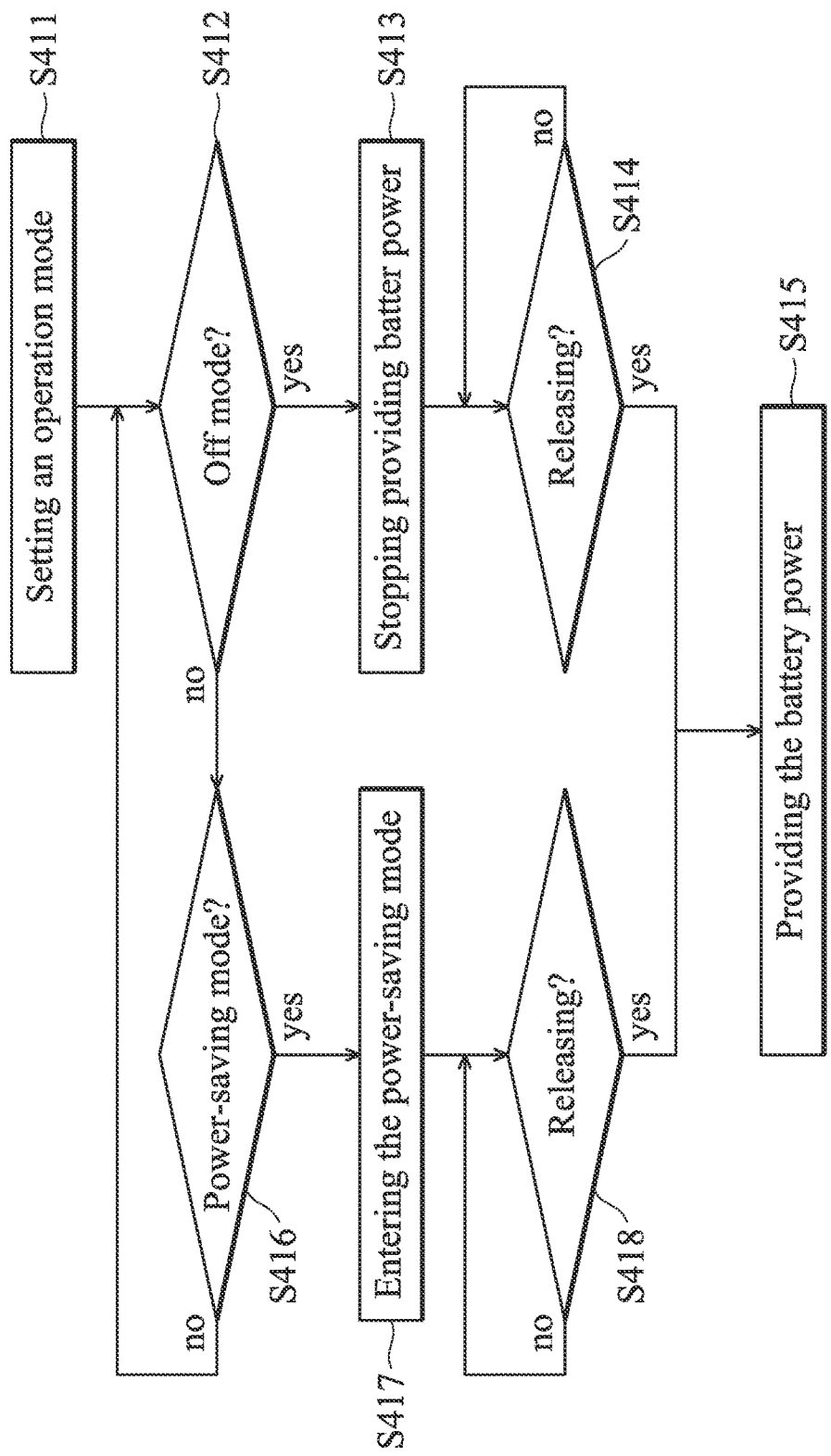
FIG. 4 is a flowchart of an exemplary embodiment of an operation method in accordance with an embodiment.

FIG. 4 is a flowchart of an exemplary embodiment of an operation method in accordance with an embodiment. The operation method is applied in the operation system shown in FIG. 1. First, an operation mode is set (step S411). In one embodiment, step S411 is to receive a user input or a device input. For example, a user utilizes a power management choice in an OS or changes the state of a device (e.g. a switch) to set the operation mode.

Step S412 determines whether an off mode is activated by the user. When the off mode is activated, step S413 is executed to stop providing batter power $P_{BTR}$. At this time, the operation system 100 operates on the AC mains. Taking FIG. 2 as an example, the control unit 204 turns off the switches 201 and 202 to stop outputting the battery power $P_{BTR}$ in the off mode.

Next, it determines whether a release event occurs (step S414). When a release event occurs, the battery power $P_{BTR}$ is output again (step S415). The invention does not limit the kind of release event. In one embodiment, the release event means that a first specific button, such as the function key F3, is pressed. In another embodiment, the release event means that a specific condition occurs. For example, the power adapter 101 is unplugged from the connection port 110 and then is plugged into the connection port 110, wherein before the power adapter 101 is unplugged from the connection port 110, the power adapter 101 had plugged to the connection port 110. In other words, the user unplugs and then plugs the power adapter to activate the battery unit to provide the battery power.

If the user activates a saving power function, a power-saving mode is entered (step S417). In the power-saving mode, the operation system 100 receives the AC mains. Taking FIG. 2 as an example, the control unit 204 turns off the switch 201 and turns on the switch 202 in the power-saving mode. Therefore, the processing device 210 cannot capture current from the battery powered device 200.

Then, it determines whether a release event occurs (step S418). When a release event occurs, the battery power $P_{BTR}$ is output again (step S415). The invention does not limit the kind of the release event. In one embodiment, the release event in step S418 means that a second specific button is pressed. The invention does not limit the type of the first and second specific button. In one embodiment, the first specific button is the same as the second specific button. The first and second specific button mean the function key F3. In another embodiment, the first specific button is different from the second specific button. For example, the first specific button is the function key F3, and the second specific button is a power key. When the power key is pressed, the operation system 100 starts operating.

In one embodiment, the user quickly and simply controls the output of the battery via an OS. Therefore, if the operation method is applied during the testing step and the assembly step, the testing step and the assembly step are performed more easily, and the time required for testing and assemble are reduced. Furthermore, while transporting the battery unit, the user can first set the battery unit in an off mode to maintain the charge of the battery unit.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A battery powered device providing battery power to a processing device via a positive terminal and a negative terminal, wherein the processing device operates on external power or the battery power and generates a turn-off command and a save command according to a user input, and the external power is provided by a connection port coupled to a power adapter, comprising:
- a first switch coupled to the positive terminal;
- a second switch coupled to the first switch;
- a battery unit coupled between the second switch and the negative terminal;
- a control unit operating in an off mode when the control unit receives the turn-off command, and operating in a power-saving mode when the control unit receives the save command, wherein when the control unit operates in the off mode, the control unit turns off the first and second switches, and when the control unit operates in the power-saving mode, the control unit turns off the first switch and turns on the second switch;
- a protection unit that stops providing the battery power to the processing device when the battery unit is abnormal; and
- a self-cut-off protector disposed between the second switch and the battery unit and controlled by the protection unit, wherein when the control unit cannot turn off the first and second switches, the protection unit triggers the self-cut-off protector to cut off a discharge path of the battery unit and stop outputting the battery power to the processing device.

2. The battery powered device as claimed in claim 1, wherein when the control unit operates in the off mode, no voltage is generated between the positive terminal and the negative terminal.

3. The battery powered device as claimed in claim 2, wherein when the control unit operates in the power-saving mode, the positive terminal and the negative terminal stop providing current.

4. The battery powered device as claimed in claim 3, wherein when the control unit operates in the off mode or in the power-saving mode, the processing device operates on the external power.

5. The battery powered device as claimed in claim 2, wherein when the control unit operates in the off mode or in the power-saving mode, the processing device operates on the external power.

6. The battery powered device as claimed in claim 1, wherein when the processing device outputs a release command, the control unit operates in a release mode and turns on the first and second switches to provide the battery power to the processing device such that the processing device operates on the battery power.

7. The battery powered device as claimed in claim 6, wherein while operating in the off mode, when a first specific button is pressed, or a specific event occurs, the processing device outputs the release command to switch the control unit from the off mode into the release mode.

8. The battery powered device as claimed in claim 7, wherein the specific event means that the power adapter is unplugged from the connection port and then plugged into the connection port, and before the power adapter is unplugged from the connection port, the power adapter is plugged into the connection port.

9. The battery powered device as claimed in claim 8, wherein the first specific button is the same as the second specific button.

10. The battery powered device as claimed in claim 7, wherein while the control unit operates in the saving mode, when a second specific button is pressed, the processing device outputs the release command to switch the control unit from the power-saving mode to the release mode, and the second specific button is a power button.

11. The battery powered device as claimed in claim 1, further comprising:
- a detection unit detecting temperature of the battery unit to generate a temperature signal, wherein the processing device outputs the turn-off command according to the temperature signal, or the control unit operates in the off mode according to the temperature signal.

* * * * *